May 20, 1930.  J. L. SERVON  1,759,665
AUTOMATIC CLUTCH AND CHANGE SPEED MECHANISM
Filed Feb. 4, 1928
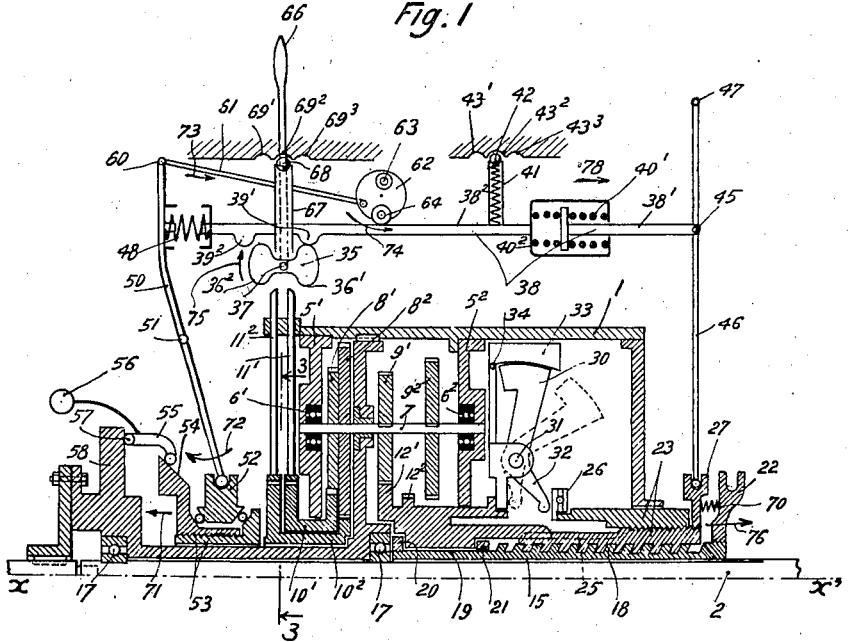
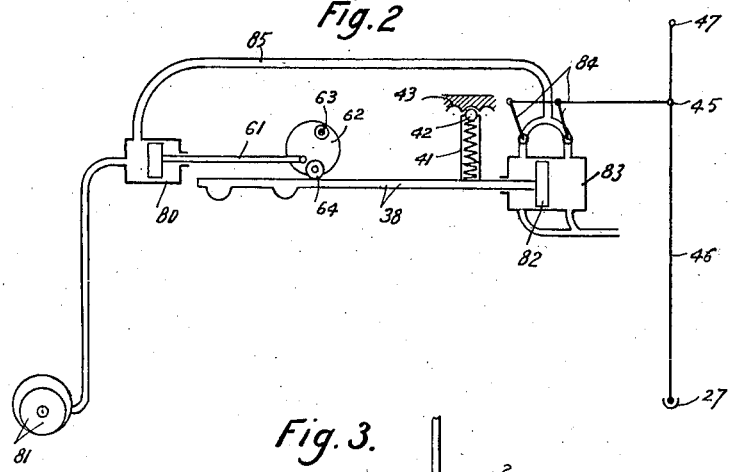
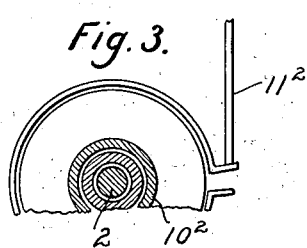
Jean Léon Servon
INVENTOR
By Otto Munk
his ATTY.

Patented May 20, 1930

1,759,665

UNITED STATES PATENT OFFICE

JEAN LÉON SERVON, OF BAYONNE, FRANCE, ASSIGNOR TO EMBRAYAGE AUTOMATIQUE BLOCH SERVON SOCIÉTÉ À RESPONSABILITÉ LIMITEE, OF PARIS, FRANCE, A LIMITED JOINT-STOCK COMPANY OF FRANCE

AUTOMATIC CLUTCH AND CHANGE-SPEED MECHANISM

Application filed February 4, 1928, Serial No. 251,786, and in France March 25, 1927.

The present invention relates to an automatic clutching and speed changing device, the feature of which is that the mechanism combines the actions of the speed of rotation of the motor, the speed of rotation of the driven shaft, and the resistance of such shaft.

The invention extends also to other numerous features hereinafter described and to their various combinations.

A mechanism according to the invention is illustrated by way of example on the accompanying drawing, in which, Figure 1 is one-half of a longitudinal or axial cross-section through a mechanism embodying the features of my invention, this view being partially diagrammatic;

Figure 2 is a diagrammatic view of a modification, a number of the elements of Figure 1 being omitted for the sake of clearness; and Figure 3 is a fragmentary cross-sectional view taken substantially along the line 3—3 of Figure 1.

The mechanism shown in Fig. 1 is composed of a hollow driving fly wheel 1, a driven shaft 2 on the same axis $x\ x^1$, a mechanism effecting the automatic change speed and of a mechanism effecting the automatic clutching. The flv wheel 1 is suitably carried by or attached to the driving shaft at the left of Figure 1, which shaft is rotated by a motor or the like (not shown).

The driving fly wheel 1 provides in its flanges $5^1$, $5^2$, housings $6^1$, $6^2$ for ball or roller bearings. These bearings support a spindle 7 on which are keyed planet wheels 8, 9. These planet wheels are divided into two groups; the planet wheels or satellite gears $8^1$ $8^2$ are in engagement with two sun gears $10^1$ $10^2$ which can either turn freely upon the driving shaft or on the other hand be locked to the frame by means of brakes $11^1$ $11^2$.

The planet wheels $9^1$ $9^2$, on the other hand, can come into engagement alternatively with two sun pinions $12^1$ $12^2$ connected to the driven shaft as hereinafter explained.

The driven shaft 2, grooved at 15 along a part of its length, is maintained coaxial with the driving drum 1 by two ball bearings 17.

A quick-pitch screw 18 is longitudinally grooved internally and keyed with easy friction to the grooved portion of the driven shaft 2. This screw has a smooth portion 19 on which the group of sun pinions $12^1$ $12^2$ can freely rotate, said group being prevented from sliding axially along this portion 19 by two abutments 20, 21 screwed on the screw 18.

A collar 22, fixed to the screw 18, enables sliding movements to be imparted to the entire screw 18 along the grooved driven shaft 2.

A nut 23 is screwed on the screw 18. This nut presents, along a part of its length, longitudinal grooves 25 along which the group of two sun pinions $12^1$ $12^2$ may slide axially.

The nut 23 carries at one of its ends a ball-bearing abutment or axially reciprocable element 26 and at its other end a collar 27 controlling the automatic clutching. A spring 70 is interposed between the collar 27 and the collar 22 and tends constantly to separate one from the other.

A block or shoe 30 is pivoted on a pivot 31 carried by the group of two sun pinions $12^1$ $12^2$; it embodies an arm or level 32 which can come into engagement with the abutment 26. At the other end, this block 30 actuates a blocking shoe 33 pivoted at 34 on an extension of the group of sun pinions $12^1$ $12^2$, in such manner, that when the block 30, under the action of centrifugal force, occupies the position indicated in full lines in Fig. 1, the shoe 33 is jammed between the external surface of the block and the internal surface of the drum 1.

The mechanisms effecting the automatic clutching and change of speed comprise the following elements: A cam or brake operating member 35, with two eccentric profiles $36^1$ $36^2$, is pivoted on a pivot 37 carried by the frame, in such manner that this cam, in oscillating, can come into engagement alternatively by means of its profiles $36^1$ $36^2$ with the brakes $11^1$ $11^2$ and effect in consequence the blocking of the planet pinions $10^1$ or $10^2$ alternatively.

The cam 35 can be actuated by hand by means of a hand lever 66. This cam has moreover a detent 67 the ball 68 of which can engage in one or the other of three notches $69^1$ $69^2$ $69^3$ formed in the frame, according to the position assumed by the cam 35.

The cam 35 is actuated automatically by a sliding rod 38 formed itself with two actuating bosses $39^1$ $39^2$. The rod 38 is divided into two aligned portions or bars $38^1$ $38^2$ between which are interposed two calibrated springs $40^1$ $40^2$ of limited stroke. It is maintained in its various positions by a spring detent 41 the ball of which engages in one or another of notches $43^1$ $43^2$ $43^3$ formed in the frame.

The part $38^1$ of the rod is pivoted at 45 to a controlling lever 46 pivoted itself at 47 on the frame and at its other end in engagement with the collar 27.

Moreover, the part $38^2$ of the rod 38 is under the influence of a spring 48 which bears against a lever 50 pivoted at 51 on the frame. This lever is engaged in a collar 52 mounted in a ball bearing abutment 53. This abutment is an axially reciprocable member which slides freely along the axis $x\ x^1$ relatively to the driving drum 1 and to the driven shaft 2 and presents an inclined face 54 engaged by the arm or lever 55 of a block or weight 56 pivoted at 57 on a prolongation 58 of the driving drum. As a result of this arrangement, the ball bearing abutment 53 is brought to different positions in accordance with the position assumed by the weight 56.

The lever 50 is, moreover, pivoted at 60 to a controlling rod 61 connected to an eccentric 62 pivoted about an axis 63. A roller 64 of this eccentric presses against the rod $38^2$ for the purpose hereinafter explained.

The mechanism described above operates in the following manner:—

On stopping or slow speed of rotation of the driving drum 1, the spring 48 presses the lever 50 in a direction such that the ball bearing abutment 53 is thrust to the rear, as indicated in Fig. 1, the inclined plane 54 thus maintaining the block 56 close to the axis $x\ x^1$.

The block 30 is maintained also near the centre, in the position indicated in dotted lines in Fig. 1, under the action of the spring 70.

The boss $39^1$ of the actuating rod 38 is opposite the boss $36^1$ of the double cam 35.

As a result of increase of speed of the motor which is not shown but which is connected to and drives the prolongation 58, the centrifugal force acting on the block 56 slides the inclined plane 54 and its abutment 53 in the direction 71, this abutment entraining with it the collar 52, which effects the angular movement of the lever 50 in the direction 71 about the pivot 51 and the compression of the spring 48.

The rod 61 is thus displaced in the direction 73 and turns the eccentric 62 in the direction 74 about the axis 63, this eccentric actuating by its roller 64 the controlling rod 38. This rod actuates by its boss $39^1$ the double cam which turns in the direction 75 about the pivot 37 and comes to press against and block the brake $11^1$.

As a result, the sun gear $10^1$ is blocked and the planet gear $8^1$ therefore rolls on the latter, which is thus held stationary. This causes the shaft 7 to rotate about its own axis; and the engagement of the planet gear $9^1$ with the sun pinion $12^1$ causes the driven shaft 2 to rotate at a slow speed.

As long as the driven shaft 2 offers a sufficient resistance to rotation, the nut 23 is maintained in place by the screw 18 and as a result the block 30 cannot move away from the dotted position, this block being abutted by its arm 32 against the abutment 26.

When the resistance of the driven shaft 2 diminishes as it picks up speed, the force exerted by the block 30 against the abutment 26 urges the nut 23 in the direction 76, this nut acting by means of the lever 46 and of the rod $38^1$ against the spring $40^1$.

When the spring $40^1$ is at the end of its stroke the rod 38 and its detent 41 are entrained violently from one notch 43 to another. The boss $39^1$ of the rod disengages itself from the boss $36^1$ of the double cam 35, whilst the boss $39^2$ of the rod comes to bear against the boss $36^2$ of the cam 35. The brake $11^1$ is therefore unlocked and frees the sun wheel $10^1$. At the same time the brake $11^2$ is blocked by the action of the boss $36^2$ and blocks the sun wheel $10^2$, which corresponds to an increased speed of drive of the driven shaft 2.

As the resistance of the driven shaft 2 to rotation diminishes further the block 30 moves further away from the axis $x\ x^1$ thrusting against the abutment 26 and tending further to displace in the direction 76 the nut 23 which acts by means of the lever 46 and of the rod $38^1$ against the spring $40^1$. When the spring $40^1$ is again at the end of its stroke, the rod $38^1$ is violently entrained in the direction 78 and the detent 41 is disengaged from the notch which it occupied in order to enter another notch.

The boss $39^2$ of the rod 38 thereupon disengages itself from the boss $36^2$ of the double cam 35. The brake $11^2$ is unlocked, as was previously the brake $11^1$, and disengages the sun wheel $10^2$. At the same time the block 30 thrusts the shoe 33 against the drum 1, by causing this shoe to turn about its pivot 34. This shoe thereupon effects a direct engagement between the driving drum 1 and the driven shaft 2. At this instant, all the rest of the mechanism serves as a fly wheel and does not transmit any power.

The speed of rotation of the motor assists the movements of the rod 38 and the detent 41 by means of the block 56, of the inclined plane 54, of the actuating lever 50, and of the spring 48.

In a similar manner, when the speed of the motor diminishes, the spring 48 exerts a lesser pressure against the rod 38. The block 30 no longer resists the action of the nut 23 which thrusts it in the direction inverse to 76 and returns it toward the dotted position.

The lever 46 acts against the spring $40^2$. When the latter is compressed the detent 41 disengages itself from the notch 43 whereupon it is engaged and the rod 38 is driven violently in the inverse direction to 78 under the reexpansion of the spring $40^2$ until the detent 41 enters the succeeding notch 43. The boss $39^2$ of the rod 38 bears against the profile $36^2$ of the double cam 35 and the brake $11^2$, thus actuated, blocks the sun gear $10^2$. At the same time the block 30 has disengaged the shoe 33 from the drum 1 and discontinued the direct engagement between the driving shaft and the driven shaft.

As the speed of the motor diminishes further, the spring 48 extends, the block 30 no longer resists the action of the nut 23 and is brought back toward the dotted position, the nut 23 displacing itself in the direction inverse to 76. In consequence the lever 46 acts against the spring $40^2$. When this latter spring is compressed, the detent 41 and the rod 36 are again violently driven in the direction inverse to 78, and the profile $39^2$ of the rod 38 disengages itself from the boss $36^2$ of the cam 35. At the same time, the boss $39^1$ of the rod 38 bears against the profile $36^1$ of the cam 35 and the brake $11^1$ blocks the sun gear $10^1$.

As the speed of the motor continues to diminish, the block 56 no longer has sufficient force to hold the inclined plane 48, which reassumes its position of rest, entraining with it the lever 50, the rod 61 in the direction opposite to 73 and the eccentric 62 which, no longer bearing against the rod 39, frees the two brakes $11^1$ $11^2$ and permits the sun gears $10^1$ $10^2$ to turn loosely as at the start, whereby it is clear that the motor can never decrease below a minimum speed without being completely declutched.

To sum up, it is seen that, in the mechanism which forms the subject of the invention, the automatic control of the clutching and of the changes of speed is a function of the combination of the actions of the speed of rotation of the motor, of the speed of rotation of the driven shaft and of the resistance of such shaft. A part of this mechanism is applicable to every governor of which the action and thrust will thus be rendered instantaneous.

In every motor, hydraulic, steam, internal combustion, or electric, if the rod $38^2$ actuates directly the admission of liquid, of steam, of combustible or of electric energy, this action (being a function of the resistance) is instantaneous whilst in existing motors the admission is influenced only in response to variations of the speed of rotation of the racing motor.

Reverse drive is obtained in the following manner in the mechanism forming the subject of the invention: When, by means of the collar 22, the parts consisting of the screw 18, the nut 23, the group of sun pinions $12^1$, $12^2$, the mounting of the block 30 and of the shoe 33 are slid towards the rear in the direction 76 in such a manner as to place in engagement the sun pinion $12^2$ with the planet gear $9^2$, the relation of the speeds is such, that on tightening the brake $11^1$ by means of the hand lever 66, in a manner to block the sun wheel $10^1$, a reverse drive is obtained, and, by acting in a similar manner on the brake $11^2$ every de-multiplied forward drive is obtained (this is what may be called the maneuvering drive).

Numerous modifications can be applied to the mechanism described above by way of example:

In particular, in Fig. 2 is shown a modification of the invention in which hydraulic control is employed. In this modification, the cam 62 pressing against the lever 38 by its roller 64, is controlled by the rod 61 of a hydraulic piston 80 actuated by oil which is supplied by a rotary pump 81 actuated directly by the motor. Moreover, the rod 38 controlling the brakes is fixed to a piston 82 which displaces itself in a cylinder 83 with a distributor 84. This distributor 84 is actuated by the lever 46, pivoted at 47. A pipe 85 interconnects the cylinder and the hydraulic piston 38 and the distributor 84.

The modification shown in Fig. 2 operates in a manner quite similar to that of the mechanism of Fig. 1.

Claims:

1. In an automatic clutching and speed changing device, the combination with a driving shaft and a driven shaft, of a fly-wheel attached to the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes.

2. In an automatic clutching and speed changing device, the combination with a driving shaft and a driven shaft, of a fly-wheel attached to the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driving shaft including a lever pivoted to the driving shaft, a weight carried thereby and movable by centrifugal force to pivot said lever, and an axially reciprocable member mounted coaxially with the driving shaft and actuated by said lever.

3. In an automatic clutching and speed changing device, the combination with a driving shaft and a driven shaft, of a fly-wheel attached to the driving shaft, a planetary gear train operatively interposed between the flywheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driving shaft including a lever pivoted to the driving shaft, a weight carried thereby and movable by centrifugal force to pivot said lever, and an axially reciprocable member mounted coaxially with the driving shaft and actuated by said lever; a pivoted brake-operating member, and an actuating lever operatively interposed between said reciprocable member and said brake-operating member.

4. In an automatic clutching and speed changing device, the combination with a driving shaft and a driven shaft, of a fly-wheel attached to the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driven shaft including a lever movable with the driven shaft, a shoe carried thereby and movable by centrifugal force to pivot said lever, and an axially reciprocable follower element mounted coaxially with the driven shaft and positioned in the path of movement of said lever.

5. In an automatic clutching and speed changing device, the combination with a driving shaft and a driven shaft, of a fly-wheel attached to the driving shaft, a planetary gear train operatively interposed between the flywheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driven shaft including a lever movable with the driven shaft, a shoe carried thereby and movable by centrifugal force to pivot said lever, and an axially reciprocable follower element mounted coaxially with the driven shaft and positioned in the path of movement of said lever; said follower element being in screw-threaded engagement with said driven shaft.

6. In an automatic clutching and speed changing device, the combination with a driving shaft and a driven shaft, of a fly-wheel attached to the driving shaft, a planetary gear train operatively interposed between the fly-wheel and the driven shaft; said gear train including a shaft carried by the fly-wheel parallel to but offset from the driven shaft, and a set of satellite gears mounted on said shaft; a pair of sun gears loosely mounted coaxially with the driven shaft and meshing with certain of said satellite gears, brakes associated with said sun gears, and means automatically responsive to the speeds of said driving and driven shafts and to the resistance of said driven shaft for controlling the operation of said brakes.

7. In an automatic clutching and speed changing device, the combination with a driving shaft and a driven shaft, of a fly-wheel attached to the driving shaft, a planetary gear train operatively interposed between the fly-wheel and the driven shaft; said gear train including a shaft carried by the fly-wheel parallel to but offset from the driven shaft, and a set of satellite gears mounted on said shaft; a set of sun pinions and a pair of sun gears loosely mounted coaxially with the driven shaft, said sun gears meshing with certain of said satellite gears, brakes associated with said sun gears, and means automatically responsive to the speeds of said driving and driven shafts and to the resistance of said driven shaft for controlling the operation of said brakes; said means responsive to the speed of the driving shaft including a lever movable with said sun pinions, a shoe carried thereby and movable by centrifugal force to pivot said lever, and a follower element splined to said sun pinions, screw-threaded to said driven shaft, and positioned in the path of movement of said lever.

8. In an automatic clutching and speed changing device, the combination with a driving shaft and a driven shaft, of a fly-wheel attached the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driven shaft including a lever movable with the driven shaft, a shoe carried thereby and movable by centrifugal force to pivot said lever, and an axially reciprocable follower element mounted coaxially with the driven shaft and positioned in the path of movement of said lever; said shoe being constructed and arranged to engage frictionally with the fly-wheel after a predetermined movement thereof.

9. In an automatic clutching and speed changing device, the combination with a driving shaft and a driven shaft, of a fly-wheel attached to the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driven shaft including a lever movable with the driven shaft, a shoe carried thereby and movable by centrifugal force to pivot said lever, an axially reciprocable follower element mounted coaxially with the driven shaft and positioned in the path of movement of said lever, and a spring urging said element against the action of said lever.

10. In an automatic clutching and speed changing device, the combination with a driving shaft and a driven shaft, of a fly-wheel attached to the driving shaft, a planetary gear train operatively interposed between the fly-wheel and the driven shaft, a pair of sun gears loosely mounted coaxially with the driven shaft and meshing with certain satellite gears of said train, a brake associated with each of said sun gears, and means automatically responsive to the speeds of said driving and driven shafts and to the resistance of said driven shaft for controlling the operation of said brakes; said means responsive to the speed of the driven shaft including a lever movable with the driven shaft, a shoe carried thereby and movable by centrifugal force to pivot said lever, an axially movable follower element mounted coaxially with the driven shaft and positioned in the path of movement of said lever, a brake-operating member, and means operatively interposed between said follower element and said brake-operating member; said last-named means including a pair of aligned bars, and a pair of oppositely acting springs between said bars.

In testimony whereof I affix my signature.

JEAN LÉON SERVON.